US007844682B2

(12) United States Patent
Nguyen

(10) Patent No.: US 7,844,682 B2
(45) Date of Patent: Nov. 30, 2010

(54) IMS NETWORK-BASED MULTIMEDIA BRIEFCASE

(75) Inventor: Tuyet-Hoa Thi Nguyen, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 406 days.

(21) Appl. No.: 11/738,877

(22) Filed: Apr. 23, 2007

(65) Prior Publication Data

US 2008/0259884 A1    Oct. 23, 2008

(51) Int. Cl.
*G06F 15/16* (2006.01)
(52) U.S. Cl. .................. 709/213; 709/206; 709/214; 709/215; 709/219; 709/220
(58) Field of Classification Search .................. 709/206, 709/213, 214, 215, 219, 220
See application file for complete search history.

(56) References Cited

U.S. PATENT DOCUMENTS

| 2004/0103157 | A1* | 5/2004 | Requena et al. ............. 709/206 |
| 2005/0198211 | A1* | 9/2005 | Park et al. .................... 709/219 |
| 2007/0198632 | A1* | 8/2007 | Peart et al. ................... 709/203 |
| 2008/0172413 | A1* | 7/2008 | Chiu ....................... 707/104.1 |

* cited by examiner

*Primary Examiner*—Jinsong Hu

(57) ABSTRACT

A system for managing multimedia is provided. The system includes an IMS (Internet Protocol Multimedia Subsystem) network that has a media server and a Call Session Control Function (CSCF) server. The system includes a data store that is in communication with the IMS network. The system also includes an application configured to promote storing multimedia data to the data store. The multimedia data is created by a client. The client communicates with the CSCF and the multimedia server to promote providing the multimedia data for storage to the data store and to promote retrieving the multimedia data stored on the data store.

20 Claims, 5 Drawing Sheets

IMS NETWORK-BASED MULTIMEDIA BRIEFCASE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

IP (Internet Protocol) Multimedia Subsystem (IMS) is an architectural framework for delivering IP multimedia services to end users. Multitudes of consumer products are available for users to capture, create, and manipulate multimedia. These products include, for example, mobile and wireless telephones with cameras, digital cameras with video recording capabilities, and audio players and recorders. As these products become more available and affordable, larger numbers of consumers use these devices an produce multimedia content.

SUMMARY

In one embodiment, a system for managing multimedia is provided. The system includes an IMS (Internet Protocol Multimedia Subsystem) network that has a media server and a Call Session Control Function (CSCF) server. The system includes a data store that is in communication with the IMS network. The system also includes an application configured to promote storing multimedia data to the data store. The multimedia data is created by a client. The client communicates with the CSCF and the multimedia server to promote providing the multimedia data for storage to the data store and to promote retrieving the multimedia data stored on the data store.

In another embodiment, a system for managing multimedia is provided. The system includes an IMS (Internet Protocol Multimedia Subsystem) network, a data store, a client, and a component. The IMS network includes a media server and a Call Session Control Function (CSCF) server. The data store is in communication with the IMS network. The client is in communication with the IMS network, the client is configured to create and store multimedia data. The component is provided on the IMS network and is configured to promote storing multimedia data sent by the client. The client communicates with the CSCF and the multimedia server to promote providing the multimedia data for storage to the data store and to promote retrieving the multimedia data stored on the data store.

Another embodiment provides a method of managing multimedia content. The method includes creating a multimedia content using a first client, and the client communicating with an application on an IMS (Internet Protocol Multimedia Subsystem) network to promote storing and managing the multimedia content.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

This disclosure provides an IMS network-based personal multimedia briefcase service (hereinafter referenced as the "personal multimedia briefcase service") that supports the storage and management of multimedia data. This provides a convenient place to store and manage all of a user's multimedia content from various sources or devices. The present disclosure may include one or more system or applications to assist the user in uploading, storing, managing, and downloading the user's multimedia content. The application, for example, might provide password protected security to restrict or limit access to the user's multimedia content. The application might provide the user the ability to create and edit the stored multimedia content. Other features and capabilities for managing multimedia content, which will readily suggest themselves to one skilled in the art, might be available. The term "multimedia data", as used herein, includes, but is in no way limited to, content such as video, audio, advertisements, still photographs or pictures, reports, graphical or text portions, and audio or video clips. The multimedia data may originate from various sources, including, but not limited to, external devices such as videophones, laptops, Personal Digital assistants (PDAs), mobile phones, WLAN phones, video recorders, audio recorders, desk phones, and so on. It should be understood that other external devices that may be included might be capable of creating, manipulating, storing or playing the multimedia data.

The personal multimedia briefcase service may be provided by a telecommunication service provider that supports IMS or IMS-compliant systems in IP networks. The personal multimedia briefcase service may be implemented by a software application that, upon execution, configures a database on an IMS network server. The configured database may then be used by a user or client for additional data storage and management, for example, of multimedia data. Although the embodiments of the personal multimedia briefcase disclosed herein focus on software-based applications, other implementations of the personal multimedia briefcase service well known to those of ordinary skill in the art may be used.

Figure 1:
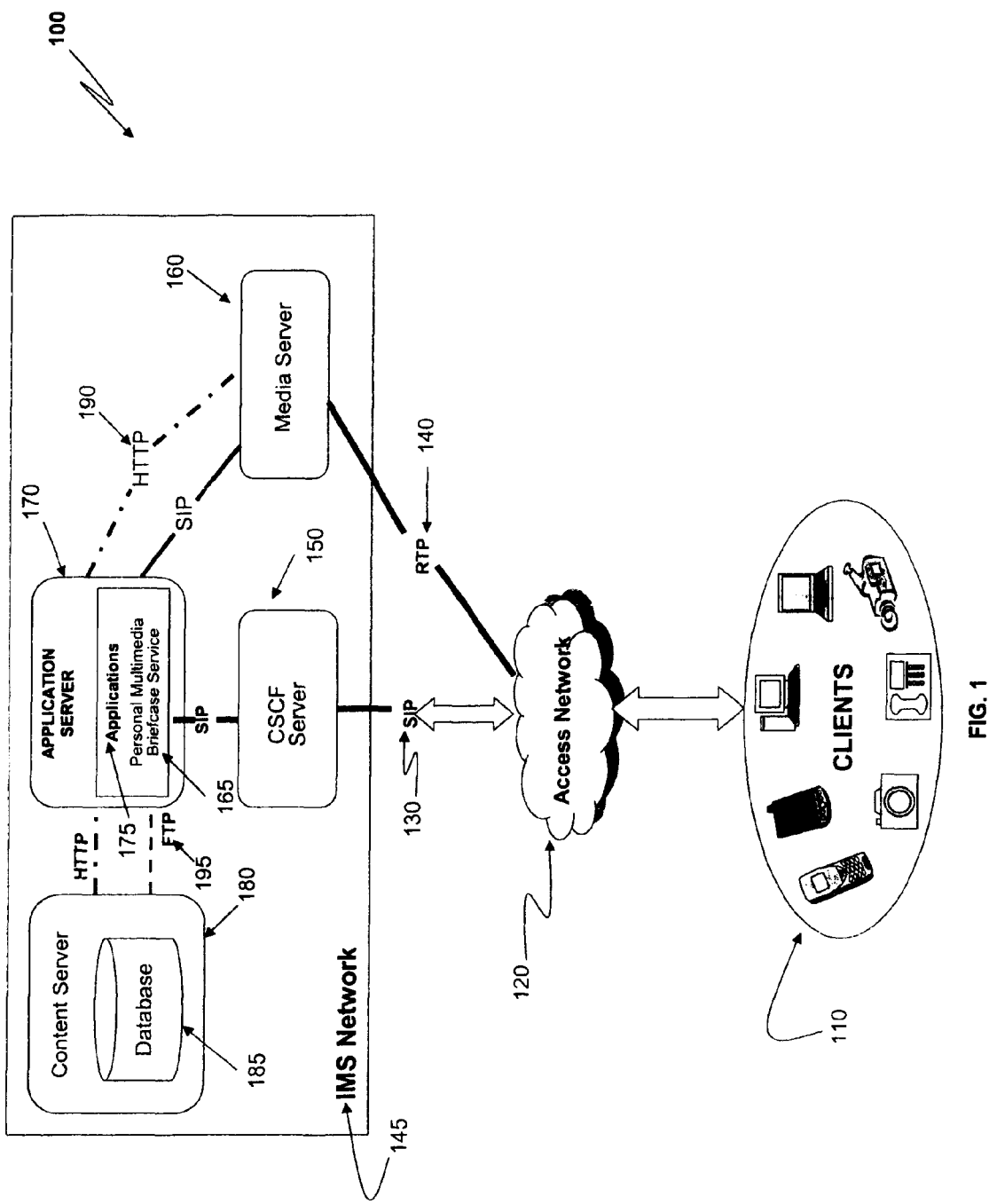
FIG. 1 illustrates a system including an IMS network according to an embodiment of the present disclosure.

FIG. 1 illustrates a system 100 including an IMS network 145 that supports the implementation of the personal multimedia briefcase service 165. As illustrated, system 100 includes clients 110, an access network 120, a media server 160, application server 170, content server 180, and a CSCF server 150.

The clients 110 may be devices, as previously discussed, such as laptops, wireless handsets, and so on that are operable to connect to the IMS network 145 through an access network 120. Clients 110 may need to connect to the IMS network 145 for a variety of purposes that may include transferring multimedia data from the client 110 to the IMS network 145. Clients 110 may also need to download data already stored on the IMS network 145 for data manipulation purposes, which will be described herein in more detail later.

The access network 120 may be a second generation (2G) type network, a third generation (3G) type network, a 3G partnership project (3GPP) type network or any other types of access networks, including fixed line, mobile, wireless networks or other types of IP access networks well known to those of ordinary skill in the art.

The media server 160 may process audio and video multimedia data and enable the recording and playback of the multimedia data. The media server 160 may also record and play audio/video announcements, enable multimedia conferencing, text-to-speech conversion, and the compression/decompression of multimedia data among other capabilities.

The application server 170 may host and execute applications corresponding to services that may be provided by the telecommunication provider to users on a subscription or fee-per-use basis. A subscriber-based service might grant user access to a service based on some prior pre-paid agreement. The subscriber is the entity that pays for access or use. The personal multimedia briefcase service 165 would be one example of a service that might be provided on a subscription or a fee-per-use basis. Examples of subscription and fee-per-use services include announcements, call forwarding, call transfer, and location-based services.

The content server 180 may serve as a storage device for data including multimedia data. The content server 180 may include one or more databases 185 operable to store data that may be created by the media server 160, clients 110, or other external components. The content server 180 may also be operable to provide stored data to the media server 160, clients 110 or other external components for playback, recording, viewing, revising, or other such data manipulation purposes.

Access to the personal multimedia briefcase service 165 on the IMS network 145 may be initiated by one or more clients 110 using a Session Initiation Protocol (SIP) protocol 130. SIP 130 is a signaling protocol capable of establishing bidirectional multimedia communication sessions between clients 110 and the IMS network 145. The clients 110 or other users may need access to the personal multimedia briefcase service 165 to enable the uploading of multimedia data, viewing or manipulation of multimedia data already stored on the IMS network 145, creating multimedia data for storage, playback of multimedia data or other such purposes.

Using SIP 130, one or more clients 110 may signal the IMS network 145 and establish a communication session. SIP 130 generally contains a description of the media content of the session so the IMS network 145 has advance notice of the type of data transmission being requested. The CSCF server 150 on the IMS network 145 intercepts the call signaling and then passes control of the SIP 130 signal to the application server 170 for service. The application server 170 determines whether or not to accept the requested communication session signaled by SIP 130. Once a communication session has been accepted, the application server 170 may provide access to the personal multimedia briefcase service 165 by activation of a software application 175 that corresponds to the personal multimedia briefcase service 165.

Activation of the software application 175 corresponding to the personal multimedia briefcase service 165 may involve the execution of the software application 175 code which may enable configuration of the database 185 on the content server 180. The configuration may involve a particular partitioning or structuring of the database. For example, a database may be configured as an indexed or other database configuration. In other scenarios, a pre-configured database may be provided. One of ordinary skill in the art should recognize the existence of a variety of database configurations that may be created and used to store and manage multimedia content. In some cases, multiple databases, individually corresponding to different clients 110 may be configured to store user-selected multimedia data.

Activation and execution of the software application 175 corresponding to the personal multimedia briefcase service 165 may also enable the management and manipulation of multimedia or other types of data. Clients or users subscribing to the personal multimedia briefcase service 175 may be authorized to perform browsing or data manipulation operations, such as delete, rename, search, view, print, or other such operations, on contents stored in the user's particular database 185 or data store or may download data from the database to perform the browsing and data manipulation operations on a client 110 or other device. In some embodiments, multimedia data, such as a user's video clips, audio recordings or other multimedia, stored in a designated database 185 on the content server 180, may be transferred to the IMS media server 160 for play back or management.

Real Time Transport Protocol (RTP) 140 serves as a carrier for multimedia data that is actual voice or video content. A client 110 or user may create or store an audio or video clip by using SIP 130 to signal the CSCF server 150 of an impending communication. Once the SIP communication connection is acknowledged and established, multimedia or other data content may be streamed between the client 110 and the media server 160 using RTP 140. Once data is received by the media server 160, the media server 160 may then playback or record audio or video data and additionally may temporarily store the information. Data may eventually be transferred to a database 185 on the content server 180 using HyperText Transfer Protocol (HTTP) 190 or a File Transfer Protocol (FTP) 195. Data may also be streamed from the media server 160 to one or more clients 110 or users using SIP/RTP protocols.

Figure 2:
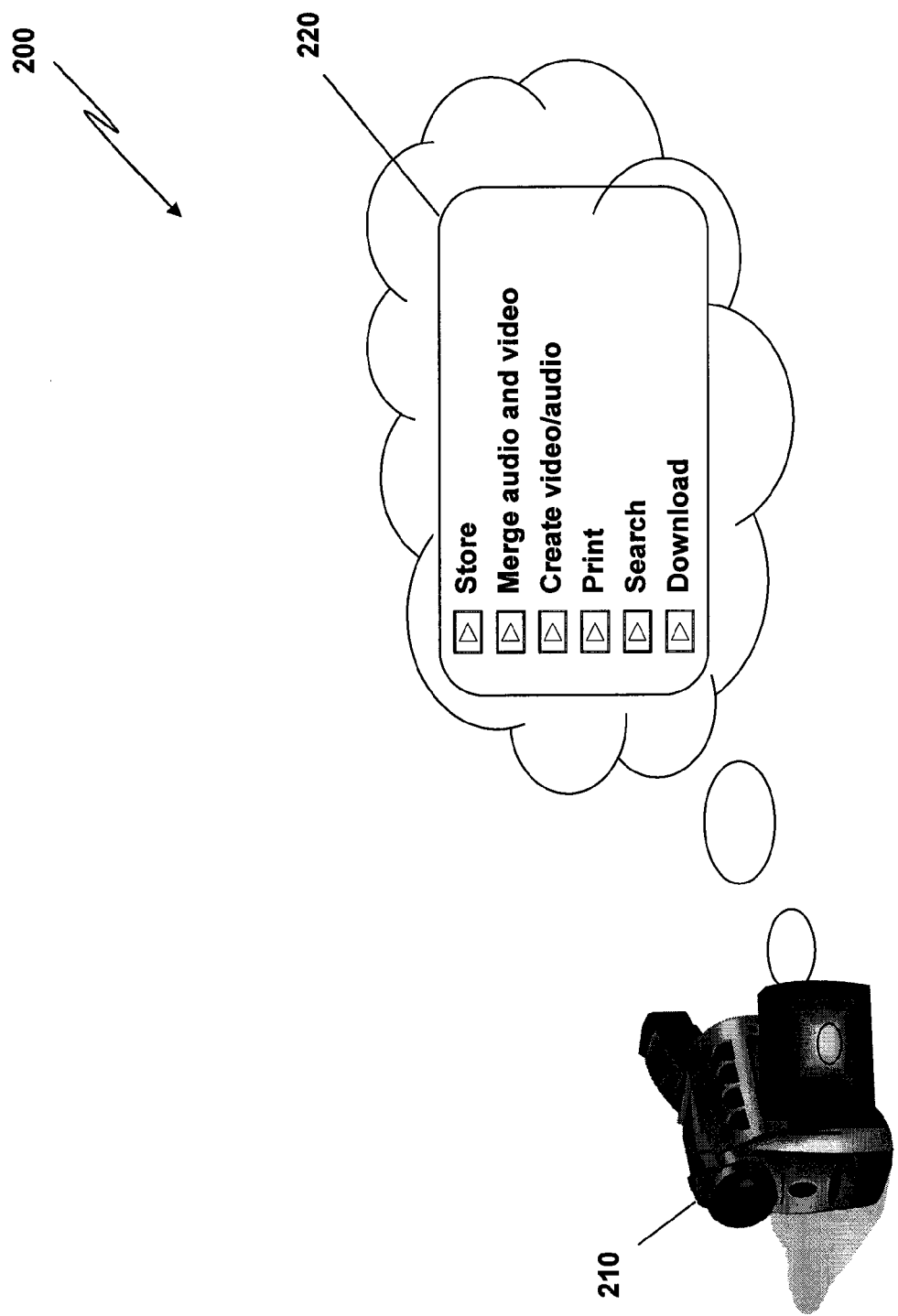
FIG. 2 illustrates a graphical user interface (GUI) on a device suitable for implementing an embodiment of the current disclosure.

In FIG. 2, illustration 200 depicts multimedia data being manipulated using a graphical user interface (GUI) 220 on a client 210 that uses the system shown in FIG. 1. The personal multimedia briefcase service 165 depicted in FIG. 1 might provide the GUI 220 to enable a user to select from a menu of options for manipulating data. The menu options may include storing the multimedia data to the database 185 on the content server 180, storing the multimedia data to a client database 210, merging audio and/or video data, creating audio and/or video data. The options might include printing data stored on the client 110 or transferring data from the database 185 on the content server 180 for printing. The menu options may also provide for searching through data already stored on the client 210 or on the content server 185 and other such data manipulation options. The menu options listed herein are not intended to be exhaustive. Instead this example merely illustrates some possible practical implementations and features of the personal multimedia briefcase service. One of ordinary skill in the art will recognize the existence of a many different scenarios that could employ the IMS multimedia briefcase service to store or manipulate the multimedia data of a user. The GUI 220 might be provided as a software application, or as a web-based application accessible via the client 110.

Figure 3:
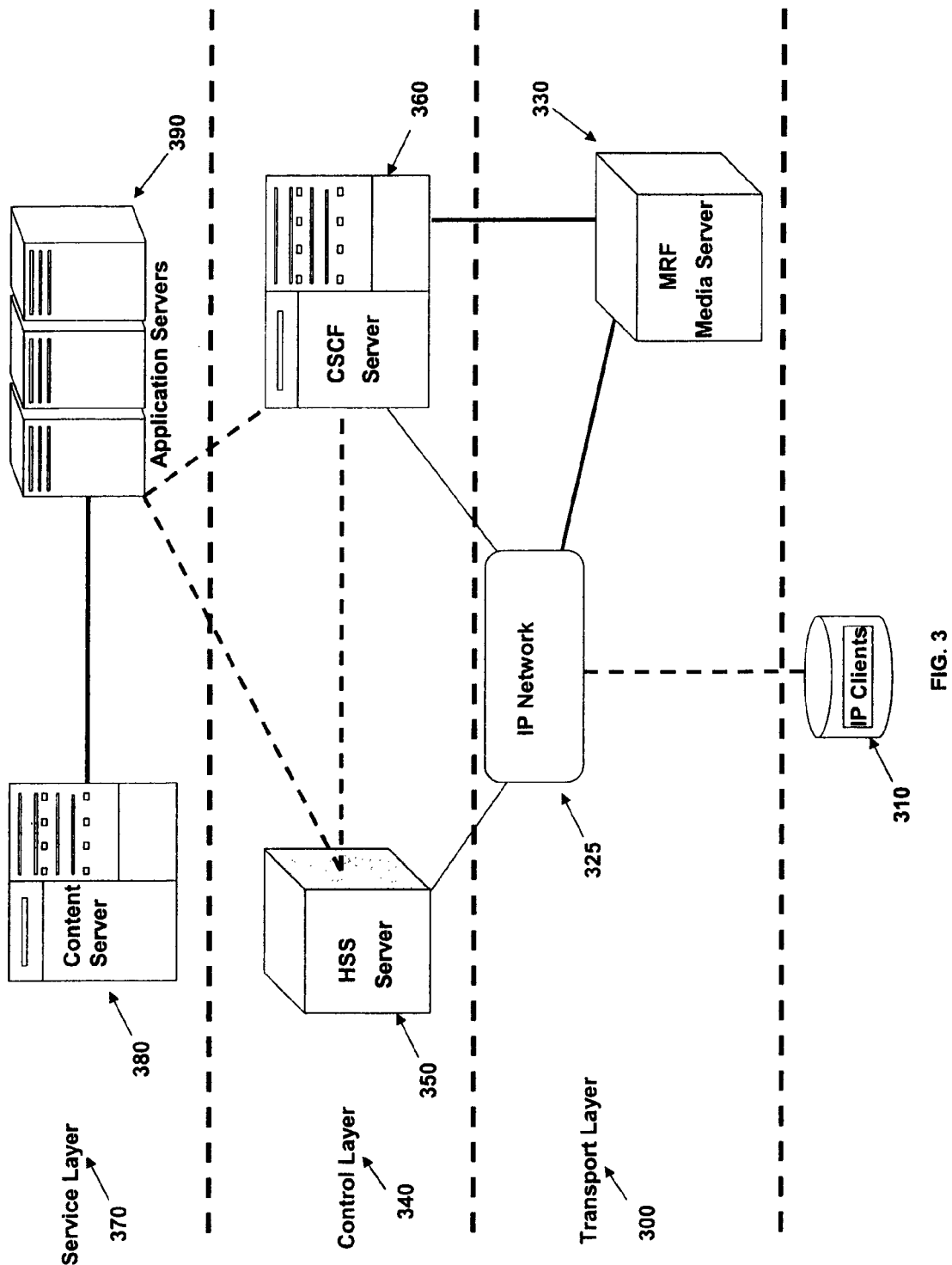
FIG. 3 illustrates an architectural view of the IMS network according to another embodiment of the disclosure.

FIG. 3 illustrates architectural aspects of the system 100 of FIG. 1 viewed from a multilayer functional perspective. The three layers comprise the transport layer 300, the control layer 340, and the service layer 370 and a description of each layer will now be provided.

The transport layer 300 provides an Internet Protocol version 6 (IPv6) access network 325 that coordinates communication sessions by initiating and terminating SIP signaling. The IMS network architecture supports interfaces for fixed access networks including DSL, cable modems, Ethernet, mobile access networks, such as CDMA200, W-CDMA, GSM, GPRS, and wireless access networks such as WLAN, WiMax etc. Other phone systems such as POTS (Plain Old Telephone System) are supported through gateways (not shown). The transport layer 300 may further include a media server 330 which provides media related services such as recording, conferencing, audio prompts, speech recognition, and playing of announcements.

The control layer 340 contains the Call Session Control Function (CSCF) server 360 and the Home Subscriber Server (HSS) 350. The CSCF server 360 functions as a centralized server in the IMS environment and manages IP calls and IP application sessions based on HSS requests. HSS 350 requests to the CSCF server 360 typically use SIP for call signaling. The CSCF server 360 intercepts the call signaling and then passes control of the signal request via SIP to the application server 390 for service. The HSS 350 maintains subscriber information for the clients connecting to the IMS network. Subscriber information includes subscriber service permissions that provide information about what services a client is authorized to access and subscriber preference settings. Additionally, the HSS 350 also handles client authorization and the authentication required to establish sessions and provide requested services. In other words, the HSS 350 determines which client may be permitted access to the different network services and applications, and when permission may be granted.

The service layer 370 supports application servers 390 and interfaces with the control layer 340 via SIP signaling. The application server or servers 390 may control the required application software or logic to host and execute applications corresponding to various telecom services that may be requested by the HSS 350 in an IMS network environment. Telecom services may include services such as the personal multimedia briefcase service. It may also include, but is in no way limited to, other telecom services such as voice messaging, paging, push-to-talk, instant messaging, multimedia multiparty conferences and other personalized telecom information services such as video-on-demand.

The service layer 370 may include a content server 380 which interfaces with application servers 390 using HTTP, SIP, or FTP protocols. The content server 380 functions as special-purpose database that specifically supports processes or application services that are based on storage of data. The content server 380 may support data manipulation operations such as search, format conversion or processing features that enable data comparison and data analysis. The architectural configuration of the IP multimedia subsystem network illustrated and described in FIG. 3 is exemplary, and other IMS network configurations might be used or later developed which will readily suggest themselves to one skilled in the art, all of which are within the spirit and scope of the present disclosure.

Figure 4:
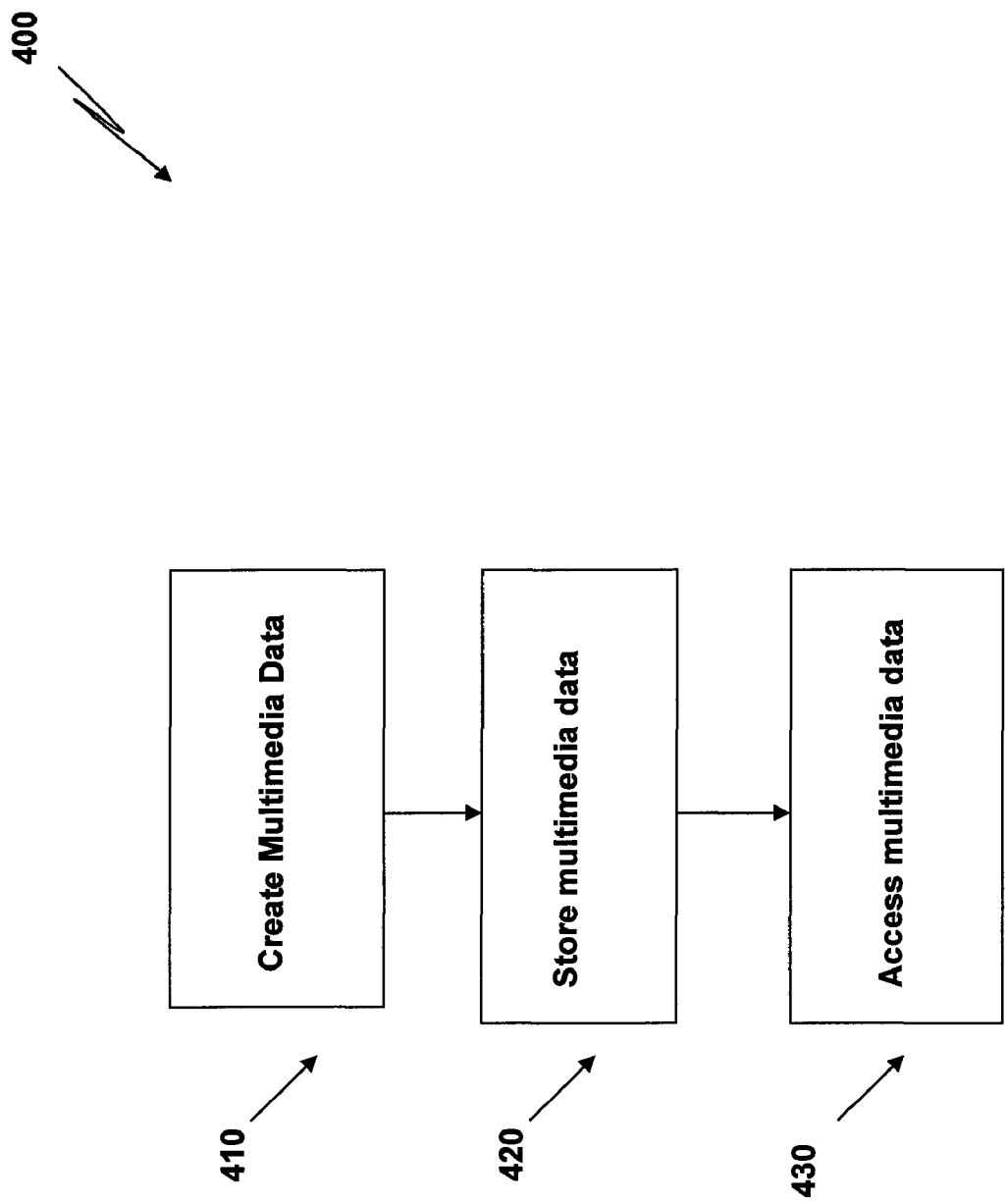
FIG. 4 illustrates a flowchart of the method according to another embodiment of the disclosure.

FIG. 4 illustrates a flow diagram 400 of one method that may be used to implement the system of FIG. 1. It is important to recognize that the method is controlled by execution of the software application that corresponds to the personal multimedia briefcase service. The software application controls the various implementations and modifications of the method that are described here or changes that may be apparent to one of ordinary skill in the art.

At 410, multimedia data may be created. It is understood that multimedia data may be created in a variety of different ways, many of which may already be well known to one of ordinary skill in the art. Multimedia data may be created on a client 110 using the latest available audio, video, or other technology. Multimedia data may also be used and managed using the playback, recording and other features of the media server 160 or data may be created on the media server 160.

At 420, the multimedia data created may be stored. The created multimedia data may be stored to the database 185 on the content server 180. The database 185 may be configured, as earlier disclosed. The created multimedia data may also be stored on a client 110 on which the multimedia data was created. It is important to note that multimedia data being created may be stored on-the-fly, i.e. as it is being created, to another client 110, to the content server 180, or to some form of external storage media well known to those of ordinary skill in the art. The created multimedia data may also be stored temporarily on a client 110 or on the media server 160 prior to being transferred to the database 185 on the content server 180. By storing the multimedia data on the database 185, storage on the client 110 is freed for other users, and the user's multimedia data is provided in a single location for management.

At 430, multimedia data that is stored on a client 110, content server 180, or temporarily stored on a media server 160 may be accessed, retrieved, manipulated and/or managed by a client 110. A user may determine what actions or data manipulation operations to perform on the multimedia data by selecting from menu options presented by a client 110 or other applications or systems.

Figure 5:
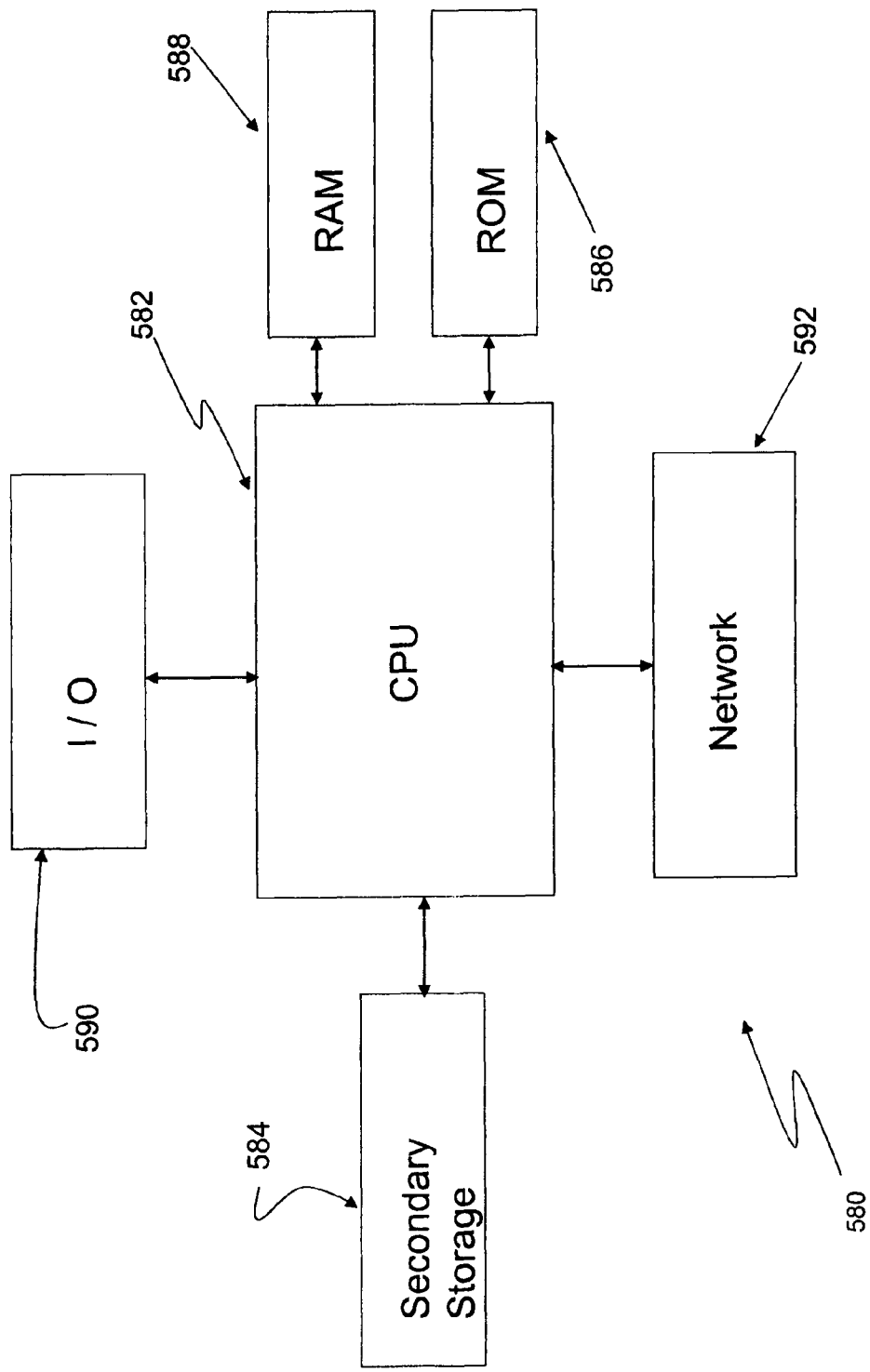
FIG. 5 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) 590 devices, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O 590 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 592 devices may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity 592 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for managing multimedia, comprising:
   an IMS (Internet Protocol Multimedia Subsystem) network including a media server and a Call Session Control Function (CSCF) server;
   a database in communication with the IMS network; and
   an application server configured to:
      store multimedia data in the database, the multimedia data created by a client and transmitted to the application server through the CSCF server;
      retrieve the multimedia data stored in the database;
      transmit the multimedia data to the client; and
      enable a user to manage the stored multimedia data.

2. The system of claim 1, wherein the multimedia data includes audio data, video data, audio-video data, text files, image files, and programs.

3. The system of claim 1, wherein the client is one of a wireless handset, a mobile phone, a personal digital assistant (PDA), a digital camera, a video recorder, an audio player, personal computer (PC), laptop computer, tablet computer, and an audio recorder.

4. The system of claim 1, wherein the IMS network has an architecture comprising:
   a transport layer that includes an access server and the media server;
   a control layer that includes the CSCF server and a Home Subscriber Server (HSS) server; and
   a service layer that includes the application server and a content server, and wherein the content server comprises one or more databases.

5. The system of claim 1, wherein the application server includes a software application accessible by the client and having a graphical user interface (GUI) that transmits to a display of the client a menu of options from which a user selects for managing the multimedia data.

6. The system of claim 1, wherein the application server communicates with a media server of the IMS network using a Session Initiation protocol.

7. A system for managing multimedia, comprising:
   an IMS (Internet Protocol Multimedia Subsystem) network including a media server and a Call Session Control Function (CSCF) server;
   a database in communication with the IMS network;
   a client in communication with the IMS network, the client configured to create and store multimedia data; and
   an application server on the IMS network configured to:
      store in the database multimedia data sent by the client through the CSCF server;
      retrieve the multimedia data stored in the database;
      transmit the multimedia data to the client; and
      enable a user to manage the stored multimedia data.

8. The system of claim 7, wherein the application server includes a software application accessible by the client and having a graphical user interface (GUI) that transmits to a display of the client a menu of options from which a user selects for managing the multimedia data.

9. The system of claim 8,
   wherein the media server communicates with the application server using a Session Initiation protocol.

10. The system of claim 7, wherein the client connects to the IMS network using one or more of a Session Initiation protocol (SIP) protocol, a Real-time Transport protocol (RTP), a Hypertext Transport Protocol (HTTP) and a File Transfer Protocol (FTP).

11. The system of claim 7, wherein the IMS network has an architecture comprising:
   a transport layer that includes an access server and the media server;
   a control layer that includes the CSCF server and a Home Subscriber Server (HSS) server; and
   a service layer that includes the application server and a content server, and wherein the content server comprises one or more databases.

12. The system of claim 11, wherein the client establishes an RTP connection to the media server and transfers data from the client to the media server.

13. A method of operating an application server, the method comprising:
   receiving multimedia data through a Call Session Control Function (CSCF) server;
   storing the multimedia data in a database in communication with an IMS (Internet Protocol Multimedia Subsystem) network, the multimedia data created by a client and transmitted to the application through the CSCF server;
   retrieving the multimedia data stored in the database;
   transmitting the multimedia data to the client; and
   enabling a user to manage the stored multimedia data.

14. The method of claim 13, wherein the multimedia data includes audio data, video data, audio-video data, text files, image files, and programs.

15. The method of claim 13, wherein the client is one of a wireless handset, a mobile phone, a personal digital assistant (PDA), a digital camera, a video recorder, an audio player, personal computer (PC), laptop computer, tablet computer, and an audio recorder.

16. The method of claim 13, wherein the application server includes a software application accessible by the client and having a graphical user interface (GUI) that transmits to a display of the client a menu of options from which a user selects for managing the multimedia data.

17. The method of claim 13, wherein the application server communicates with a media server of the IMS network using a Session Initiation protocol.

18. The method of claim 17, wherein the client establishes an RTP connection to a media server of the IMS network and transfers data from the client to the media server.

19. The method of claim 13, wherein the client connects to the IMS network using one or more of a Session Initiation protocol (SIP) protocol, a Real-time Transport protocol (RTP), a Hypertext Transport Protocol (HTTP) and a File Transfer Protocol (FTP).

20. The method of claim 13, wherein the IMS network has an architecture comprising:
   a transport layer that includes an access server and the media server;
   a control layer that includes the CSCF server and a Home Subscriber Server (HSS) server; and
   a service layer that includes the application server and a content server, and wherein the content server comprises one or more databases.

* * * * *